Patented Nov. 14, 1939

2,180,009

UNITED STATES PATENT OFFICE 2,180,009

PRECIPITATION OF CELLULOSE TRIACETATE

Carl J. Malm, Rochester, N. Y., assignor to Eastman Kodak Company, Rochester, N. Y., a corporation of New Jersey No Drawing. Application June 16, 1938, Serial No. 214,145

4 Claims. (Cl. 260—230)

This invention relates to the precipitation of cellulose triacetate from its reaction mixture by first separating the ester from the liquid in which it is dissolved using acetic acid of 40–60% strength and then coagulating the ester with hot water.

Although the acetone-soluble type of cellulose acetate is that most commonly employed commercially at the present time, considerable interest has recently been shown in cellulose triacetate due to its high water-resistance and the elimination of the hydrolysis step, thus increasing the yield and lowering production costs.

When cellulose triacetate is made by acetylating cellulose with a reaction mixture which is a solvent for the resulting product, the product usually after isolation, washing and drying has an undesirable physical form, being horny and difficult to dissolve. Acetylation with a mixture which has been rendered non-solvent of the triacetate has been proposed but this has not been satisfactory due to the expense involved in recovering the constituents of the spent esterification mixture.

One object of my invention is to provide a process for recovering cellulose triacetate from its reaction mixture in a form in which it can be readily dissolved and worked up. Other objects of my invention will appear herein.

I have found that a cellulose triacetate may be recovered from the reaction mixture in which it is dissolved in a soft, easily dissolved form if the reaction mixture is slowly introduced into aqueous acetic acid of 40–60% concentration, being maintained at that concentration by the introduction of small amounts of water until the ester separates in gel form, after which the ester is treated with hot water to break the gel and thereby complete the precipitation.

Cellulose acetates have previously been treated with hot water but such treatments have been primarily to stabilize the cellulose ester. No one to my knowledge has previously precipitated substantially fully acetylated cellulose by the combination of steps employed in accordance with my invention.

In precipitation processes to separate a substantially fully acetylated cellulose from its reaction mixture in which water or dilute aqueous acetic acid is the precipitating liquid, the cellulose ester is obtained in a stringy, hard form and washing, even with boiling water, will not give a soft product.

In my process the separation of the cellulose triacetate from the reaction mixture may be regarded as a semi-precipitation. By employing a precipitation bath which is maintained at an acetic acid strength of 40–60% throughout the precipitation the cellulose ester is obtained in a translucent, gel form which is susceptible to coagulation by hot water. After the ester is separated from its reaction mixture, it is washed with hot water which breaks the gel and completes the precipitation of the ester. The product will then dry to a soft, while material which is readily susceptible to dissolution by one of the solvents therefor, such as methylene chloride with or without a lower aliphatic alcohol), tetrachlorethane, chloroform, etc.

The water used for washing should preferably be near the boiling point for best results although water having a temperature of at least 130° F. may be used. Instead of washing with hot water immediately following the precipitation, the cellulose acetate may be washed with cold water until free from acid and thereafter may be boiled for a few hours.

The following examples illustrate processes in which the precipitation of the substantially fully acetylated cellulose is carried out in accordance with my invention.

Example I 500 lbs. of cellulose were treated with 2600 lbs. of acetic acid for 1 hour at 130° F. The mixture was cooled to 100° F. and 600 lbs. of acetic acid containing 2000 cc. of sulfuric acid was added. The mass was cooled until the temperature was at 65° F. A mixture of 1400 lbs. of acetic anhydride and 2000 cc. of sulfuric acid was then added and the esterification was carried out in such a manner that the maximum temperature reached did not exceed 100° F. The esterification was completed in 2 hours.

The reaction mixture was then slowly introduced with vigorous stirring into a large excess of acetic acid of 50% strength. Water was also added from time to time to keep the precipitating liquid at fairly uniform concentration. The ester in the form of a translucent gel was separated from the precipitating bath by countercurrent washing and was then repeatedly washed, while agitating, with water having a temperature of 180–200° F. until it was free of acid. Upon drying a soft, white, fibrous product resulted.

Example II 50 parts of cellulose was mixed with 490 parts of glacial acetic acid containing 3½ parts of a mixed catalyst consisting of a mixture of 3 parts phosphoric and 1 part sulfuric acids. After standing at 38° C. for 4 hours the mass was cooled to approximately 15° C. 150 parts of 85% acetic anhydride was stirred in and the reaction occurred. If the acetic anhydride is added rapidly, some cooling is desirable to prevent an excessive maximum temperature. When the fibers disappeared, the clear dope or solution was slowly introduced into an agitated precipitation bath consisting of acetic acid or 40-60% strength. The bath was kept at this strength by adding water thereto during the precipitation.

The ester in the form of gel was separated from the bath and washed with water at ordinary temperature until free from acid. It was then placed in boiling water and remained therein 3-4 hours. The product was removed from the water and dried by a mild drying treatment such as by passing a current of air having a temperature of 150-200° F. over or through the material. The product was a soft, white, non-horny material readily susceptible to dissolution by its solvents.

My invention is not limited as to the acetylation processes. Any process which prepares in solution, substantially fully acetylated cellulose of satisfactory quality may be employed in conjunction with my invention.

If the acid is removed by water at ordinary temperature prior to the hot water treatment, the washing may be counter-current and the boiling treatment may then be given.

Due to their ease of dissolution the cellulose triacetates, precipitated as described, are eminently suitable for preparing sheeting, synthetic yarn, lacquers or in any process in which dissolving the ester is necessary. Due to the high moisture resistance of substantially fully acetylated cellulose, the ester, precipitated as described, is eminently suited for use where this characteristic is of importance.

I claim:

1. A process for precipitating substantially fully acetylated cellulose from its reaction mixture in which it is dissolved which comprises introducing the reaction mixture into a precipitating bath consisting of acetic acid of 40-60% strength, which bath is maintained at this strength throughout the introduction of the reaction mixture therein, removing the ester therefrom and treating the ester with hot water until a product is obtained which upon drying is soft and non-horny.

2. A process for precipitating substantially fully acetylated cellulose from its reaction mixture in which it is dissolved which comprises introducing the reaction mixture into a precipitating bath consisting of acetic acid of 40-60% strength, which bath is maintained at this strength throughout the introduction of the reaction mixture therein, removing the ester therefrom, washing out the acid and then treating with boiling water until a product is obtained which upon drying is soft and non-horny.

3. A process for precipitating substantially fully acetylated cellulose from its reaction mixture in which it is dissolved which comprises introducing the reaction mixture into a precipitating bath consisting of acetic acid of approximately 50% strength, which bath is maintained at this strength throughout the introduction of the reaction mixture therein, removing the ester therefrom and treating the ester with water having a temperature of approximately 212° F. until a product is obtained which upon drying is soft and non-horny.

4. A process for precipitating substantially fully acetylated cellulose which has been prepared by acetylating cellulose with a mixture of acetic anhydride, acetic acid and an acetylation catalyst, in which mixture it is dissolved, which comprises introducing the mass into a precipitating bath consisting of acetic acid of 40-60% strength, which bath is maintained at this strength throughout the precipitation, removing the cellulose ester therefrom and treating it with water having a temperature of at least 130° F. until a product is obtained which, upon drying, is soft and non-horny.

CARL J. MALM.